US009466168B2

(12) United States Patent
Farrar

(10) Patent No.: US 9,466,168 B2
(45) **Date of Patent: *Oct. 11, 2016**

(54) GAMING SYSTEM AND METHOD FOR REWARDING PLAYERS

(71) Applicant: IGT, Las Vegas, NV (US)

(72) Inventor: Paul Farrar, Victoria (AU)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,030

(22) Filed: Nov. 6, 2015

(65) Prior Publication Data

US 2016/0063800 A1 Mar. 3, 2016

Related U.S. Application Data

(63) Continuation of application No. 13/603,032, filed on Sep. 4, 2012, now Pat. No. 9,183,701.

(60) Provisional application No. 61/541,241, filed on Sep. 30, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ....... *G07F 17/3211* (2013.01); *G07F 17/3239* (2013.01); *G07F 17/3244* (2013.01); *G07F 17/3255* (2013.01)

(58) Field of Classification Search

USPC ............................ 463/19, 20, 22, 25, 39, 42

See application file for complete search history.

(56) References Cited

U.S. PATENT DOCUMENTS

| | | | |
|---|---|---|---|
| 6,267,671 | B1 | 7/2001 | Hogan |
| 6,302,793 | B1 | 10/2001 | Fertitta, III et al. |
| 6,398,643 | B1 | 6/2002 | Knowles et al. |
| 6,578,199 | B1 | 6/2003 | Tsou et al. |
| 6,620,046 | B2 | 9/2003 | Rowe |
| 6,652,380 | B1 | 11/2003 | Luciano |
| 6,712,697 | B2 | 3/2004 | Acres |
| 6,722,985 | B2 | 4/2004 | Criss-Puszkiewicz et al. |
| 6,722,986 | B1 | 4/2004 | Lyons et al. |
| 6,776,715 | B2 | 8/2004 | Price |
| 6,848,995 | B1 | 2/2005 | Walker et al. |
| 6,908,387 | B2 | 6/2005 | Hedrick et al. |
| 6,997,807 | B2 | 2/2006 | Weiss |
| 7,025,674 | B2 | 4/2006 | Adams et al. |
| 7,083,518 | B2 | 8/2006 | Rowe |
| 7,083,520 | B2 | 8/2006 | Rowe |
| 7,094,149 | B2 | 8/2006 | Walker et al. |
| 7,112,138 | B2 | 9/2006 | Hedrick et al. |
| 7,198,571 | B2 | 4/2007 | Lemay et al. |

(Continued)

FOREIGN PATENT DOCUMENTS

| | | |
|---|---|---|
| JP | 2007-307246 | 11/2007 |

*Primary Examiner* — Adetokunbo O Torimiro

(74) *Attorney, Agent, or Firm* — Neal, Gerber & Eisenberg LLP

(57) ABSTRACT

A gaming system and method of rewarding players of electronic gaming machines connected by a network to a host computer which stores player-useable points at a network-accessible location, awards a personal points multiplier to a player, and applies the personal points multiplier to at least some of the points.

20 Claims, 6 Drawing Sheets

(56) References Cited

U.S. PATENT DOCUMENTS

| | | | |
|---|---|---|---|
| 7,303,470 | B2 | 12/2007 | George et al. |
| 7,303,475 | B2 | 12/2007 | Britt et al. |
| 7,311,605 | B2 | 12/2007 | Moser |
| 7,318,774 | B2 | 1/2008 | Bryant et al. |
| 7,526,447 | B2 | 4/2009 | Rowe |
| 7,611,411 | B2 | 11/2009 | Griswold et al. |
| 7,617,151 | B2 | 11/2009 | Rowe |
| 7,674,180 | B2 | 3/2010 | Graham et al. |
| 7,701,344 | B2 | 4/2010 | Mattice et al. |
| 7,740,538 | B2 | 6/2010 | Nguyen et al. |
| 7,749,081 | B1 | 7/2010 | Acres |
| 7,758,429 | B2 | 7/2010 | Crivelli et al. |
| 7,775,876 | B2 | 8/2010 | Rowe |
| 7,780,525 | B2 | 8/2010 | Walker et al. |
| 7,862,430 | B2 | 1/2011 | Baerlocher et al. |
| 7,867,081 | B2 | 1/2011 | Schneider et al. |
| 7,892,092 | B2 | 2/2011 | Matthews et al. |
| 7,927,212 | B2 | 4/2011 | Hedrick et al. |
| 7,985,133 | B2 | 7/2011 | Baerlocher et al. |
| 7,988,551 | B2 | 8/2011 | Walker et al. |
| 7,993,199 | B2 | 8/2011 | Iddings et al. |
| 8,012,009 | B2 | 9/2011 | Iddings et al. |
| 8,057,298 | B2 | 11/2011 | Nguyen et al. |
| 8,096,873 | B2 | 1/2012 | Walker et al. |
| 8,135,644 | B2 | 3/2012 | Rowe |
| 8,202,156 | B2 | 6/2012 | Bartholomew |
| 8,449,384 | B2 | 5/2013 | Baerlocher et al. |
| 2002/0123376 | A1 | 9/2002 | Walker et al. |
| 2002/0155887 | A1 | 10/2002 | Criss-Puszkiewicz et al. |
| 2003/0013513 | A1 | 1/2003 | Rowe |
| 2003/0083943 | A1 | 5/2003 | Adams et al. |
| 2003/0212597 | A1 | 11/2003 | Ollins |
| 2003/0232647 | A1 | 12/2003 | Moser |
| 2004/0113360 | A1 | 6/2004 | George et al. |
| 2004/0142742 | A1 | 7/2004 | Schneider et al. |
| 2004/0166931 | A1 | 8/2004 | Criss-Puszkiewicz et al. |
| 2004/0214622 | A1 | 10/2004 | Atkinson |
| 2005/0003890 | A1 | 1/2005 | Hedrick et al. |
| 2005/0009601 | A1 | 1/2005 | Manfredi et al. |
| 2005/0059480 | A1 | 3/2005 | Soukup et al. |
| 2005/0143166 | A1 | 6/2005 | Walker et al. |
| 2005/0153768 | A1 | 7/2005 | Paulsen |
| 2005/0153773 | A1 | 7/2005 | Nguyen et al. |
| 2005/0239546 | A1 | 10/2005 | Hedrick et al. |
| 2005/0261059 | A1 | 11/2005 | Nguyen et al. |
| 2005/0261060 | A1 | 11/2005 | Nguyen et al. |
| 2005/0261061 | A1 | 11/2005 | Nguyen et al. |
| 2006/0143085 | A1 | 6/2006 | Adams et al. |
| 2006/0148561 | A1 | 7/2006 | Moser |
| 2006/0277100 | A1 | 12/2006 | Parham |
| 2008/0051195 | A1 | 2/2008 | Hedrick et al. |
| 2008/0076496 | A1 | 3/2008 | Baerlocher et al. |
| 2008/0076534 | A1 | 3/2008 | Iddings et al. |
| 2008/0076542 | A1 | 3/2008 | Iddings et al. |
| 2008/0076571 | A1 | 3/2008 | Freking |
| 2008/0076576 | A1 | 3/2008 | Graham et al. |
| 2009/0082109 | A1 | 3/2009 | Sepich et al. |
| 2009/0088239 | A1 | 4/2009 | Iddings et al. |
| 2009/0270180 | A1 | 10/2009 | Stewart |
| 2010/0120499 | A1 | 5/2010 | Cohen |
| 2010/0267444 | A1 | 10/2010 | Walker et al. |
| 2011/0212764 | A1 | 9/2011 | Baerlocher et al. |
| 2011/0269545 | A1 | 11/2011 | Kelly et al. |
| 2012/0088573 | A1 | 4/2012 | Hedrick et al. |

Press Point Play to convert points to XtraCredits

GAMING SYSTEM AND METHOD FOR REWARDING PLAYERS

PRIORITY

This application is a continuation of, claims priority to and the benefit of U.S. patent application Ser. No. 13/603,032, filed on Sep. 4, 2012, which claims priority to and the benefit of U.S. Provisional Patent Application No. 61/541,241, filed on Sep. 30, 2011, the entire contents of each are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

The present disclosure relates to a method and system for rewarding players of electronic gaming machines. The electronic gaming machines are connected by a computer network to a host computer.

BACKGROUND

Linking together electronic gaming machines on a computer network is known. It is also known for such electronic gaming machines to provide various different bonuses which provide awards to players at their respective gaming machines that are over and above any awards dictated by the pay tables of the gaming machines One such known bonus award is paid randomly to one of the players via that player's gaming machine. Once a gaming machine is selected for this type of bonus award, a computer on the network transmits a command to the gaming machine that causes the gaming machine to pay a predetermined amount to the player.

Another known type of award is personal to each player and is based on the level of that player's play. For example, a player may be issued a player-tracking card that is insertable into a card reader associated with each gaming machine. The network collects data relating to the player's play and stores it in a central computer. Known personal awards to the player may be a predetermined amount or a percentage of the player's total play. They are awarded upon the occurrence of a predetermined event such as when the player's cumulative wagers exceed a predetermined level.

Player tracking points is another benefit sometimes given to players of networked gaming machines. Each player who uses their card accrues a predetermined number of points for each dollar wagered on the networking gaming machines. Some systems award points for jackpots won on the gaming machines. In any event, the player is eligible to redeem his or her points for complimentary meals, merchandise, or other awards determined by the gaming venue that operates the gaming machines.

One concern of the gaming establishments operating gaming machines is the overhead caused by unused gaming machines. Gaming establishment operators are also interested in rewarding players of gaming machines by providing extra benefits to those players.

In light of the competitiveness of the gaming industry, there remains a need by gaming establishment operators to better reward players of gaming machines by the provision of awards to desired players.

SUMMARY

Various aspects of the present disclosure provide gaming systems and methods which reward players of electronic gaming machines connected by a network to a host computer by: (a) storing player-useable points at a network-accessible location; (b) awarding a personal points multiplier to a player; and (c) applying the personal points multiplier to at least some of the points.

In one or more embodiments, the gaming system and method applies the personal points multiplier prior to storage at the points storage location.

In other embodiments, the gaming system and method applies the personal points multiplier after storage at the points storage location.

In one or more embodiments, the points storage location forms part of a player account.

In one or more embodiments, the gaming system and method includes enabling the player to use at least some of the points by converting them into monetary units, wherein the monetary units are convertible into credits for wagering on at least one of the electronic gaming machines.

In one or more embodiments, the gaming system and method includes enabling the player to use at least some of the points by redeeming them for non-gaming activities.

In one or more embodiments, the gaming system and method enables the player to selectively apply the personal points multiplier.

In one or more embodiments, the player can only apply the personal points multiplier to the conversion rate during a predetermined time period.

In one or more embodiments, the gaming system and method enables the player to select when to initiate the predetermined time period.

In one or more embodiments, the gaming system and method enables the player to pause the predetermined time period.

In one or more embodiments, the gaming system and method and method awards the personal points multiplier during a preselected awards period.

In one or more embodiments, the gaming system and method awards the personal points multiplier based on the occurrence of a game event.

In one or more embodiments, a player of one of the electronic gaming machines may be awarded the personal points multiplier as a celebration prize as a result of a winning wager being placed on another of the electronic gaming machines by another player.

Another aspect of the present disclosure provides a gaming system including: (a) a plurality of electronic gaming machines; (b) a data storage device for storing player-useable points at a network-accessible location; and (c) a host computer connected to the plurality of electronic gaming machines by a network, the host computer being configured to store the points at a network-accessible location, and to apply a personal points multiplier to at least some of the points.

A further aspect of the present disclosure provides a method of rewarding players of electronic gaming machines connected by a network to a host computer including storing player-useable units of value at a network-accessible location, awarding a personal units multiplier to a player, and applying the personal units multiplier to at least some of the units of value.

Another aspect of the present disclosure provides a gaming system including: (a) a plurality of electronic gaming machines; (b) a data storage device for storing player-useable units of value at a network-accessible location; and (c) a host computer connected to the plurality of electronic gaming machines by a network, the host computer being configured to store the units of value at a network-accessible location, and to apply a personal units multiplier to at least some of the units of value.

BRIEF DESCRIPTION OF THE DRAWINGS

Various aspects and features of the present disclosure will be more fully understood with reference to the drawings in which.

DETAILED DESCRIPTION

Figure 1:
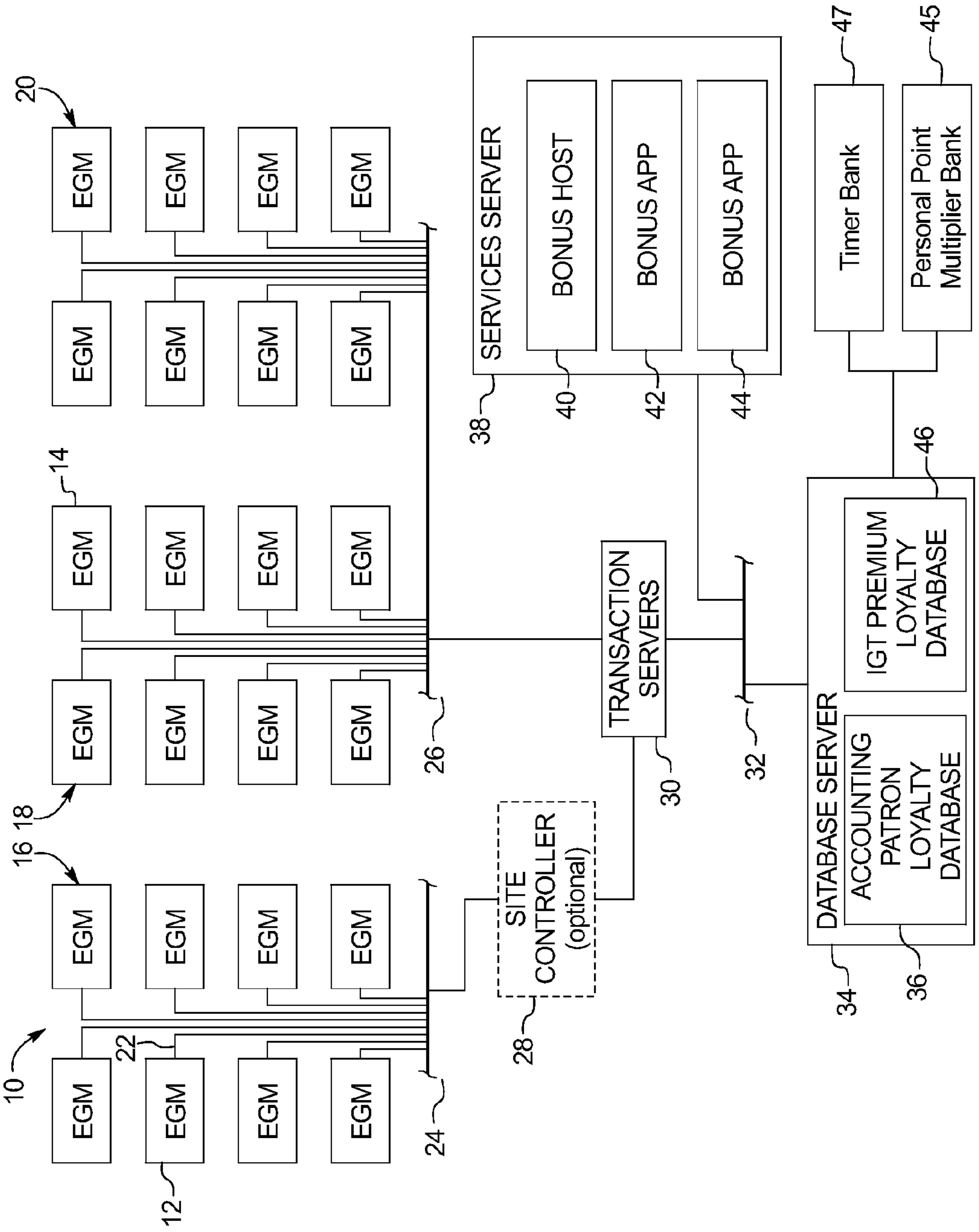
FIG. 1 is a schematic diagram of an example embodiment of a plurality of electronic gaming machines interconnected by a computer network to a host computer in which embodiments of the present disclosure may be implemented.

The present disclosure may be implemented in various configurations for electronic gaming machines ("EGM" or "EGMs"), including but not limited to: (1) a dedicated EGM wherein the computerized instructions for controlling any games (which are provided by the EGM) are provided with the EGM prior to delivery to a gaming establishment; and (2) a changeable EGM wherein the computerized instructions for controlling any games (which are provided by the EGM) are downloadable to the EGM through a data network after the EGM is in a gaming establishment. In one embodiment, the computerized instructions for controlling any games are executed by at least one central server, central controller, or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller, or remote host to an EGM local processor and memory devices. In such a "thick client" embodiment, the EGM local processor executes the communicated computerized instructions to control any games (or other suitable interfaces) provided to a player.

In one embodiment, one or more EGMs in a gaming system may be thin client EGMs and one or more EGMs in the gaming system may be thick client EGM. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

In one embodiment, the EGM includes at least one processor such as a microprocessor, a microcontroller-based platform, a suitable integrated circuit or one or more application-specific integrated circuits (ASIC's). The processor is in communication with or operable to access or to exchange signals with at least one data storage or memory device. In one embodiment, the processor and the memory device reside within the cabinet of the EGM. The memory device stores program code and instructions, executable by the processor, to control the EGM. The memory device also stores other data such as image data, event data, player input data, random or pseudo-random number generators, pay-table data or information, and applicable game rules that relate to the play of the EGM. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the EGMs disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement part of the present disclosure. In one embodiment, the EGMs disclosed herein are operable over a wireless network, for example as part of a wireless gaming system. In one such embodiment, the EGM may be a hand-held device, a mobile device, or any other suitable wireless device that enables a player to play any suitable game at a variety of different locations. In various embodiments in which the EGM is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that an EGM as disclosed herein may be a device that has obtained approval from a regulatory gaming commission or a device that has not obtained approval from a regulatory gaming commission.

In one embodiment, as discussed in more detail below, the EGM randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the EGM generates the award or other game outcome to be provided to the player based on the associated probabilities. In this embodiment, since the EGM generates outcomes randomly or based upon one or more probability calculations, there is no certainty that the EGM will ever provide the player with any specific award or other game outcome.

In another embodiment, as discussed in more detail below, the EMG employs a predetermined or finite set or pool of awards or other game outcomes. In this embodiment, as each award or other game outcome is provided to the player, the EGM flags or removes the provided award or other game outcome from the predetermined set or pool. Once flagged or removed from the set or pool, the specific provided award or other game outcome from that specific pool cannot be provided to the player again. This type of EGM provides players with all of the available awards or other game outcomes over the course of the play cycle and guarantees the amount of actual wins and losses.

In another embodiment, as discussed below, upon a player initiating game play at the EGM, the EGM enrolls in a bingo game. In this embodiment, a bingo server calls the bingo balls that result in a specific bingo game outcome. The resultant game outcome is communicated to the individual EGM to be provided to a player. In one embodiment, this bingo outcome is displayed to the player as a bingo game and/or in any form in accordance with the present disclosure.

In one or more embodiments, the EGM includes one or more display devices controlled by the processor. The display devices are preferably connected to or mounted on the cabinet of the EGM. The display devices may also display any suitable secondary game associated with the primary game as well as information relating to the primary or secondary game. The display devices may also serve as digital glass operable to advertise games or other aspects of the gaming establishment. In one embodiment, the EGM includes a credit display which displays a player's current number of credits, cash, account balance, or the equivalent. In one embodiment, the EGM includes a bet display which displays a player's amount wagered. In one embodiment, as described in more detail below, the EGM includes a player tracking display which displays information regarding a player's play tracking status.

In other embodiments, at least one display device may be a mobile display device, such as a PDA or tablet PC, that enables play of at least a portion of the primary or secondary game at a location remote from the EGM.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the EGM are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

In certain embodiments, the EGM includes at least one payment device in communication with the processor. A payment device such as a payment acceptor includes a note, ticket or bill acceptor wherein the player inserts paper money, a ticket, or voucher and a coin slot where the player inserts money, coins, or tokens. In other embodiments, payment devices such as readers or validators for credit cards, debit cards or credit slips may accept payment. In one embodiment, a player may insert an identification card into a card reader of the EGM. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the EGM. In one embodiment, money may be transferred to an EGM through electronic funds transfer. When a player funds the EGM, the processor determines the amount of funds entered and displays the corresponding amount on the credit or other suitable display as described above.

In one embodiment, the EGM includes at least one and preferably a plurality of input devices in communication with the processor. The input devices can include any suitable device which enables the player to produce an input signal which is received by the processor. In one embodiment, after appropriate funding of the EGM, the input device is a game activation device, such as a play button or a pull arm (not shown) which is used by the player to start any primary game or sequence of events in the EGM. The play button can be any suitable play activator such as a bet one button, a max bet button, or a repeat the bet button. In one embodiment, upon appropriate funding, the EGM begins the game play automatically. In another embodiment, upon the player engaging one of the play buttons, the EGM automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the EGM.

In one embodiment, one input device is a cash out button. The player may push the cash out button and cash out to receive a cash payment or other suitable form of payment corresponding to the number of remaining credits. In one embodiment, when the player cashes out, a payment device, such as a ticket, payment, or note generator prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the EGM disclosed herein.

In one embodiment, as mentioned above, one input device is a touch-screen coupled with a touch-screen controller or some other touch-sensitive display overlay to allow for player interaction with the images on the display. The touch-screen and the touch-screen controller are connected to a video controller. A player can make decisions and input signals into the EGM by touching the touch-screen at the appropriate locations. One such input device is a conventional touch-screen button panel.

The EGM may further include a plurality of communication ports for enabling communication of the processor with external peripherals, such as external video sources, expansion buses, game or other displays, a SCSI port, or a keypad.

In one embodiment, the EGM includes a sound generating device controlled by one or more sounds cards which function in conjunction with the processor. In one embodiment, the sound generating device includes at least one and preferably a plurality of speakers or other sound generating hardware and/or software for generating sounds, such as by playing music for the primary and/or secondary game or by playing music for other modes of the EGM, such as an attract mode. In one embodiment, the EGM provides dynamic sounds coupled with attractive multimedia images displayed on one or more of the display devices to provide an audio-visual representation or to otherwise display full-motion video with sound to attract players to the EGM. During idle periods, the EGM may display a sequence of audio and/or visual attraction messages to attract potential players to the EGM. The videos may also be customized to provide any appropriate information.

In one embodiment, the EGM may include a sensor, such as a camera, in communication with the processor (and possibly controlled by the processor), that is selectively positioned to acquire an image of a player actively using the EGM and/or the surrounding area of the EGM. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

The EGM can incorporate any suitable wagering game as the primary or base game. The EGM may include some or all of the features of conventional EGMs. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the multi-dimensional cascading symbol game is implemented as a base or primary game.

In one or more embodiments, a base or primary game may be a slot game with one or more paylines. In these embodiments, the EGM includes at least one and preferably a plurality of reels, such as three to five reels, in either electromechanical form with mechanical rotating reels or video form with simulated reels and movement thereof. In one embodiment, an EGM includes a plurality of adjacent, rotatable reels which may be combined and operably coupled with an electronic display of any suitable type. In another embodiment, if the reels are in video form, one or more of the display devices, as described above, displays the plurality of simulated video reels. Each reel displays a plurality of indicia or symbols, such as bells, hearts, fruits, numbers, letters, bars, or other images which preferably correspond to a theme associated with the EGM. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the EGM enables a player to wager on one or more of such paylines to activate such wagered on paylines.

In another embodiment wherein one or more paylines are formed between at least two symbol display positions which are adjacent to each other, the EGM enables a player to wager on and thus activate a plurality of symbol display positions. In this embodiment, one or more paylines which are formed from a plurality of adjacent active symbol display positions on a requisite number of adjacent reels are activated.

In one embodiment, the EGM awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the EGM determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the EGM provides the player one award for that occurrence of the generated winning symbol combination. For example, if one winning symbol combination is generated on the reels, the EGM will provide a single award to the player for that winning symbol combination (i.e., not based on the number of paylines that would have passed through that winning symbol combination). It should be appreciated that because an EGM that enables wagering on ways to win provides the player one award for a single occurrence of a winning symbol combination and an EGM with paylines may provide the player more than one award for the same occurrence of a single winning symbol combination (i.e., if a plurality of paylines each pass through the same winning symbol combination), it is possible to provide a player at a ways to win EGM with more ways to win for an equivalent bet or wager on a traditional slot EGM with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the EGM with at least one symbol generated in an active symbol display position. For example, a three reel EGM with three symbols generated in active symbol display positions on each reel includes 27 ways to win (i.e., 3 symbols on the first reel×3 symbols on the second reel×3 symbols on the third reel). A four reel EGM with three symbols generated in active symbol display positions on each reel includes 81 ways to win (i.e., 3 symbols on the first reel×3 symbols on the second reel×3 symbols on the third reel×3 symbols on the fourth reel). A five reel EGM with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the EGM enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of EGM enables a player to wager on one, more than one or all of the reels and the processor of the EGM uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the EGM provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the EGM provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the EGM individually determines if a symbol generated in an active symbol display position on a first reel forms part of a winning symbol combination with or is otherwise suitably related to a symbol generated in an active symbol display position on a second reel. In this embodiment, the EGM classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the EGM classifies the two cherry symbols as a string of related symbols because the two cherry symbols form part of a winning symbol combination.

After determining if any strings of related symbols are formed between the symbols on the first reel and the symbols on the second reel, the EGM determines if any of the symbols from the next adjacent reel should be added to any of the formed strings of related symbols. In this embodiment, for a first of the classified strings of related symbols, the EGM determines if any of the symbols generated by the next adjacent reel form part of a winning symbol combination or are otherwise related to the symbols of the first string of related symbols. If the EGM determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the EGM adds the related cherry symbol generated on the third reel to the previously classified string of cherry symbols.

On the other hand, if the EGM determines that no symbols generated on the next adjacent reel are related to the symbols of the first string of related symbols, the EGM marks or flags such string of related symbols as complete. For example, if the first string of related symbols is the string of related cherry symbols and none of the symbols of the third reel are related to the cherry symbols of the previously classified string of cherry symbols, the EGM marks or flags the string of two cherry symbols as complete.

After either adding a related symbol to the first string of related symbols or marking the first string of related symbols as complete, the EGM proceeds as described above for each of the remaining classified strings of related symbols which were previously classified or formed from related symbols on the first and second reels.

After analyzing each of the remaining strings of related symbols, the EGM determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the EGM marks each of the remaining pending strings of related symbols as complete.

When each of the strings of related symbols is marked complete, the EGM compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the EGM enables the player to play a conventional game of video draw poker and initially deals five cards all face up from a virtual deck of fifty-two cards. Cards may be dealt as in a traditional game of cards or in the case of the EGM, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the EGM deals the replacement cards from the remaining cards in the deck. This results in a final five-card hand. The EGM compares the final five-card hand to a payout table which utilizes conventional poker hand rankings to determine the winning hands. The EGM provides the player with an award based on a winning hand and the number of credits the player wagered.

In another embodiment, the base or primary game may be a multi-hand version of video poker. In this embodiment, the EGM deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the EGM displays a plurality of selectable indicia or numbers on at least one of the display devices. In this embodiment, the player selects at least one bit potentially a plurality of the selectable indicia or numbers via an input device such as a touch screen. The EGM then displays a series of drawn numbers and determine an amount of matches, if any, between the player's selected numbers and the EGM's drawn numbers. The player is provided an award based on the amount of matches, if any, based on the amount of determined matches and the number of numbers drawn.

In one embodiment, in addition to winning credits or other awards in a base or primary game, the EGM may also give players the opportunity to win credits in a bonus or secondary game or in a bonus or secondary round. In one embodiment, the multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition occurs based on exceeding a certain amount of game play (such as number of games, number of credits, amount of time), or reaching a specified number of points earned during game play.

In another embodiment, the EGM processor or central controller randomly provides the player one or more plays of one or more secondary games. In one such embodiment, the EGM does not provide any apparent reason to the player for qualifying to play a secondary or bonus game. In this embodiment, qualifying for a bonus game is not triggered by an event in or based specifically on any of the plays of any primary game. That is, the EGM may simply qualify a player to play a secondary game without any explanation or alternatively with simple explanations. In another embodiment, the EGM (or central server) qualifies a player for a secondary game at least partially based on a game triggered or symbol triggered event, such as at least partially based on the play of a primary game.

In one embodiment, the EGM includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, one or more of the EGMs are in communication with each other and/or at least one central controller through a data network or remote communication link. In this embodiment, the central server, central controller or remote host is any suitable server or computing device which includes at least one processor and at least one memory or storage device. In different such embodiments, the central server is a progressive controller or a processor of one of the EGMs in the gaming system. In these embodiments, the processor of each EGM is designed to transmit and receive events, messages, commands, or any other suitable data or signal between the individual EGM and the central server. The EGM processor is operable to execute such communicated events, messages, or commands in conjunction with the operation of the EGM. Moreover, the processor of the central server is designed to transmit and receive events, messages, commands, or any other suitable data or signal between the central server and each of the individual EGMs. The central server processor is operable to execute such communicated events, messages, or commands in conjunction with the operation of the central server. It should be appreciated that one, more or each of the functions of the central controller, central server or remote host as disclosed herein may be performed by one or more EGM processors. It should be further appreciated that one, more or each of the functions of one or more EGM processors as disclosed herein may be performed by the central controller, central server or remote host.

In one embodiment, the game outcome provided to the player is determined by a central server or controller and provided to the player at the EGM. In this embodiment, each of a plurality of such EGMs is in communication with the central server or controller. Upon a player initiating game play at one of the EGMs, the initiated EGM communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the EGM.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated EGM. The EGM receives the generated or selected game outcome and provides the game outcome to the player. In an alternative embodiment, how the generated or selected game outcome is to be presented or displayed to the player, such as a reel symbol combination or a hand of cards dealt in a card game, is also determined by the central server or controller and communicated to the initiated EGM to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked EGMs based on the results of a bingo, keno, or lottery game. In this embodiment, each individual EGM utilizes one or more bingo, keno, or lottery games to determine the predetermined game outcome value provided to the player for the interactive game played at that EGM. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each EGM is enrolled in the bingo game, such as upon an appropriate wager or engaging an input device, the enrolled EGM is provided or associated with a different bingo card. Each bingo card consists of a matrix or array of elements, wherein each element is designated with separate indicia, such as a number. It should be appreciated that each different bingo card includes a different combination of elements. For example, if four bingo cards are provided to four enrolled EGMs, the same element may be present on all four of the bingo cards while another element may solely be present on one of the bingo cards.

In operation of these embodiments, upon providing or associating a different bingo card with each of a plurality of enrolled EGMs, the central controller randomly selects or draws, one at a time, a plurality of the elements. As each element is selected, a determination is made for each EGM as to whether the selected element is present on the bingo card provided to that enrolled EGM. This determination can be made by the central controller, the EGM, a combination of the two, or in any other suitable manner. If the selected element is present on the bingo card provided to that enrolled EGM, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the EGM requires the player to engage a daub button (not shown) to initiate the process of the EGM marking or flagging any selected elements.

After one or more predetermined patterns are marked on one or more of the provided bingo cards, a game outcome is determined for each of the enrolled EGMs based, at least in part, on the selected elements on the provided bingo cards. As described above, the game outcome determined for each EGM enrolled in the bingo game is utilized by that EGM to determine the predetermined game outcome provided to the player. For example, a first EGM to have selected elements marked in a predetermined pattern is provided a first outcome of win $10 which will be provided to a first player regardless of how the first player plays in a first game, and a second EGM to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled EGM will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of an EGM may be provided a supplemental or intermittent award regardless of whether the enrolled EGM's provided bingo card wins or does not win the bingo game as described above.

In another embodiment, one or more of the EGMs are in communication with a central server or controller for monitoring purposes only. That is, each individual EGM randomly generates the game outcomes to be provided to the player and the central server or controller monitors the activities and events occurring on the plurality of EGMs. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In the various embodiments of the present disclosure, the EGMs are associated with or otherwise integrated with one or more player tracking systems. Player tracking systems enable gaming establishments to recognize the value of customer loyalty through identifying frequent customers and rewarding them for their patronage. The EGM and/or player tracking system tracks any player's gaming activity at the EGM. In one such embodiment, the EGM includes at least one card reader in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The EGM and/or associated player tracking system timely tracks any suitable information or data relating to the identified player's gaming session. Directly or via the central controller, the EGM processor communicates such information to the player tracking system. The EGM and/or associated player tracking system also timely tracks when a player removes their player tracking card when concluding play for that gaming session. In another embodiment, rather than requiring a player to insert a player tracking card, the EGM utilizes one or more portable devices carried by a player, such as a cell phone, a radio frequency identification tag or any other suitable wireless device to track when a player begins and ends a gaming session. In another embodiment, the EGM utilizes any suitable biometric technology or ticket technology to track when a player begins and ends a gaming session.

During one or more gaming sessions, the EGM and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments such tracked information and/or any suitable feature associated with the player tracking system is displayed on a player tracking display. In various embodiments, such tracked information and/or any suitable feature associated with the player tracking system is displayed via one or more service windows (not shown) which are displayed on the central display device and/or the upper display device.

In one embodiment, a plurality of the EGMs are capable of being connected together through a data network. In one embodiment, the data network is a local area network (LAN), in which one or more of the EGMs are substantially proximate to each other and an on-site central server or controller as in, for example, a gaming establishment or a portion of a gaming establishment. In another embodiment, the data network is a wide area network (WAN) in which one or more of the EGMs are in communication with at least one off-site central server or controller. In this embodiment, the plurality of EGMs may be located in a different part of the gaming establishment or within a different gaming establishment than the off-site central server or controller. Thus, the WAN may include an off-site central server or controller and an off-site EGM located within gaming establishments in the same geographic area, such as a city or state. The WAN gaming system may be substantially identical to the LAN gaming system described above, although the number of EGMs in each system may vary relative to one another.

In another embodiment, the data network is an internet or intranet. In this embodiment, the operation of the EGM can be viewed at the EGM with at least one internet browser. In this embodiment, operation of the EGM and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more EGMs are in communication with a central server or controller. The central server or controller may be any suitable server or computing device which includes at least one processor and a memory or storage device. In alternative embodiments, the central server is a progressive controller or another EGM in the gaming system. In one embodiment, the memory device of the central server stores different game programs and instructions, executable by an EGM processor, to control the EGM. Each executable game program represents a different game or type of game which may be played on one or more of the EGMs in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or otherwise stored on the EGM) or vice versa.

In this embodiment, each EGM at least includes one or more display devices and/or one or more input devices for interaction with a player. A local processor, such as the above-described EGM processor or a processor of a local server, is operable with the display device(s) and/or the input device(s) of one or more of the EGMs.

In operation, the central controller is operable to communicate one or more of the stored game programs to at least one local processor. In different embodiments, the stored game programs are communicated or delivered by embedding the communicated game program in a device or a component (e.g., a microchip to be inserted in an EGM), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the EGM. That is, when a game program is communicated to a local processor, the local processor changes the game or type of game played at the EGM.

In another embodiment, a plurality of EGMs at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve EGMs distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the EGM hardware and software and the progressive gaming system host site computer. In one embodiment, an individual EGM may trigger a progressive award win. In another embodiment, a central server (or the progressive gaming system host site computer) determines when a progressive award win is triggered. In another embodiment, an individual EGM and a central controller (or progressive gaming system host site computer) work in conjunction with each other to determine when a progressive win is triggered, for example through an individual EGM meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, an EGM is randomly or apparently randomly selected to provide a player of that EGM one or more progressive awards. In one such embodiment, the EGM does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the EGMs in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for an EGM to qualify to be selected to obtain one of the progressive awards. In one embodiment, this minimum wager level is the maximum wager level for the primary game in the EGM. In another embodiment, no minimum wager level is required for an EGM to qualify to be selected to obtain one of the progressive awards.

In another embodiment, a plurality of players at a plurality of linked EGMs in a gaming system participate in a group gaming environment. In one embodiment, a plurality of players at a plurality of linked EGMs work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked EGMs compete against one another for one or more awards. In one such embodiment, a plurality of players at a plurality of linked EGMs participate in a gaming tournament for one or more awards. In another embodiment, a plurality of players at a plurality of linked EGMs play for one or more awards wherein an outcome generated by one EGM affects the outcomes generated by one or more linked EGMs.

Turning now to the figures, and particularly to FIG. 1, FIG. 1 is a schematic diagram illustrating example EGMs, such as EGMs 12 and 14, interconnected by a computer network 10. In this illustrated embodiment, the EGM includes a slot machine. As mentioned above, it should be appreciated that the present disclosure can be implemented with other EGMs. Included in the network are three banks of EGMs, indicated generally at 16, 18, and 20, of EGMs. Each EGM is connected via an Ethernet network connection, like connection 22, 24, and 26 to a site controller 28 or transaction server 30. The site controller and transaction server includes application software, operating system and server hardware. The site controller at 28 functions as a data control switch and concentrator to route data from EGMs at remote sites to transaction servers at 30. The transaction server connected via Ethernet connection 32 to database server 34 functions to place all the data gathered from each of the EGMs into a format compatible with the accounting/patron loyalty database 36. The transaction server 30 also facilitates data communication between the EGMs in its associated bank and the other components on the network for purposes such as messages that appear on displays associated with each EGM. The database server 34 includes application software, operating system and server hardware.

The services server 38 connected via Ethernet connection 32 hosts additional service applications that include bonus host 40 used to control bonus applications 42 on the network. The services server includes application software, operating system and server hardware. Each bonus application at 42 and 44 includes a set of rules for awarding jackpots in excess of those established by the pay tables on each EGM. For example, some bonus awards may be made randomly, while others may be made to link to groups of EGMs operating in a progressive jackpot mode.

Databases 36 and 46 respectively maintain a set of bonus values and a set of timers for controlling the period during which the bonus values are available to players having been awarded a bonus prize. Databases 36 and 46 are operably connected to, and controlled by, transaction servers 30, bonus host 40 and bonus apps 42 and 44.

Databases 45 and 47 respectively maintain a bank of point multiplier values and a bank of timers for controlling the period during which the point multiplier values are available to players having been awarded a personal points multiplier prize. Databases 45 and 47 are operably connected to, and controlled by, the database server 34.

Figure 2A:
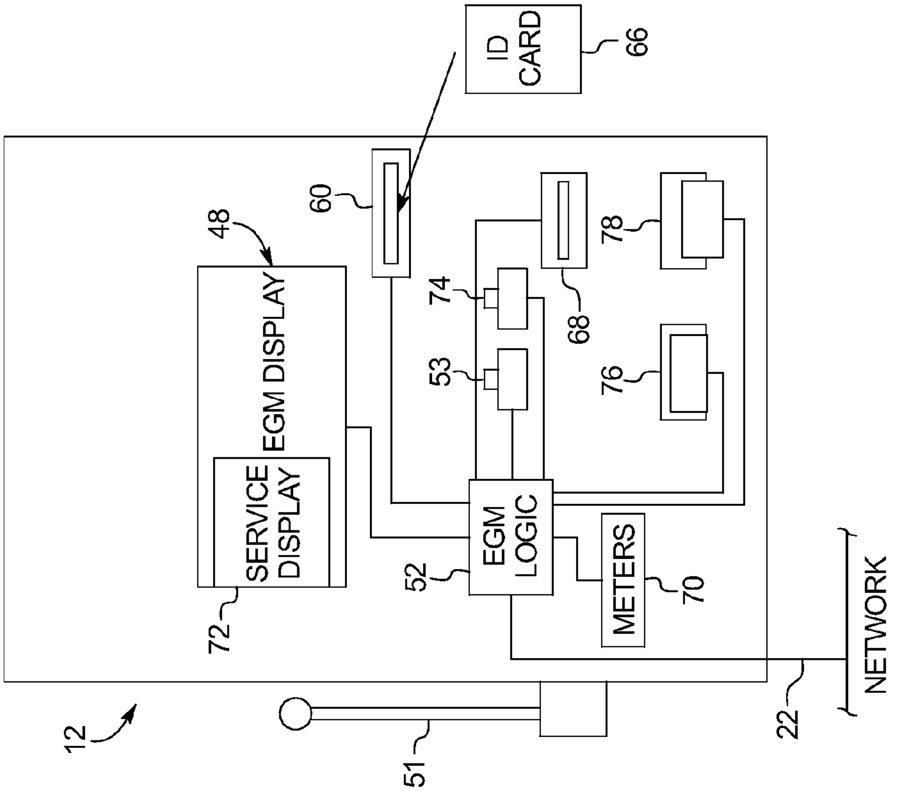
FIGS. 2 and 2*a* are schematic diagrams of different example embodiments of an electronic gaming machine and associated hardware forming part of the network shown in FIG. 1.
Figure 2:
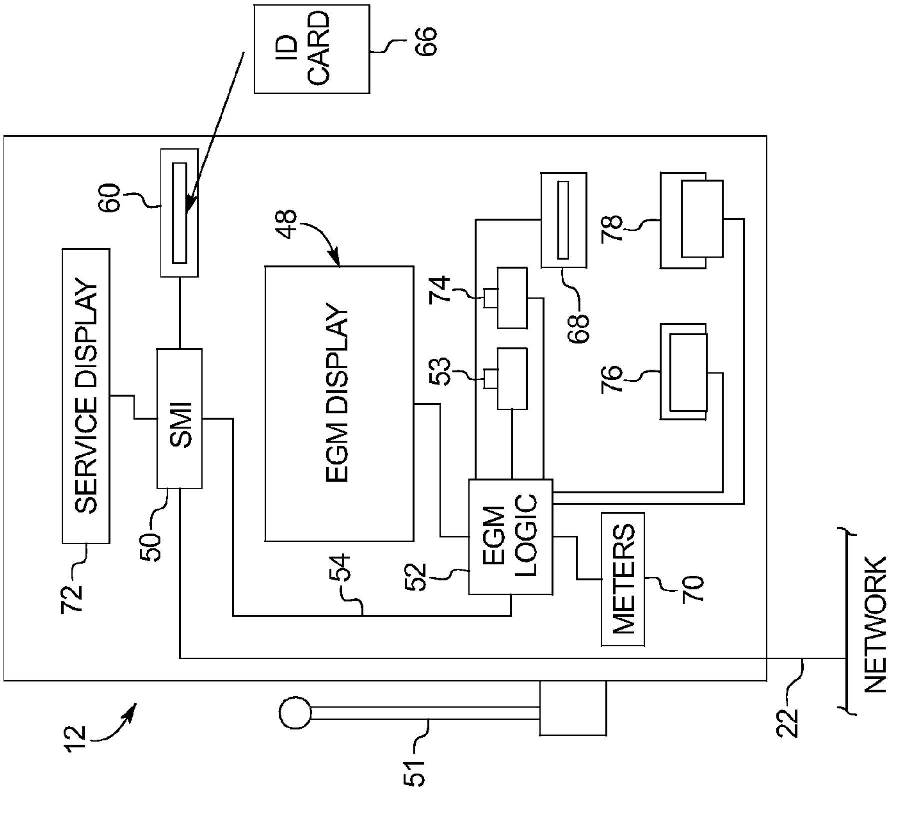

FIGS. 2 and 2*a* are highly schematic representations of example electronic gaming machines, which are typical of each of the electronic gaming machines in the network, and incorporates network communications hardware as described hereinafter. Preferably a network connection 22, directly to the EGM Logic 52 or SMI 50 facilitates communication between the EGM and Host system (FIGS. 1-28, 30). Communication between the SMI 50 and EGM Logic 52 occurs via a network connection 54. EGM Logic 52, controls the operation of EGM 12. Included in EGM 12 are three reels. Each reel includes a plurality of different symbols thereon. The reels spin in response to a pull on handle 51 or actuation of a spin button 53 after a wager is made. The three reels may be implemented as physical reels or, as is shown in FIG. 1, as a display 48 controlled by the EGM Logic 52 depicting virtual representations of the reels. SMI 50 may include a random access memory (RAM), which can be used as later described herein. The SMI also facilitates communication between the network and a display (Service Display) 72, and a card reader 60. In another embodiment FIG. 2*a* the card reader 60 is shown to connect the EGM Logic 52, and the service display 72 functionality in the EGM Display 48.

Before describing play according to the present disclosure, description will first be made of an example play on an electronic gaming machine, like EGM 12. A player plays EGM 12 by placing a wager and then pulling handle 51 or depressing spin button 53. The wager may be placed by inserting a bill into a bill acceptor 68. A typical slot machine, like EGM 12, includes a coin acceptor (not shown) that may also be used by the player to make a wager.

The EGM Display 48 notably displays a credit meter that indicates the total number of credits available for the player to wager. The credits are in the base denomination of the machine. For example, in a 5 cent slot machine, when a ten dollar bill is inserted into bill/ticket acceptor 68, a credit of 200 appears on EGM Display 48. Similarly, in a 10 cent slot machine, when a ten dollar bill is inserted into bill/ticket acceptor 68, a credit of 100 appears on credit meter displayed on EGM Display 48.

To place a wager, the player depresses a coin-in button (not shown), which transfers a credit from the credit meter to a coin-in meter, which is also displayed on the EGM Display 48. Each time the button is depressed a single credit transfers to the coin-in meter up to a maximum bet that can be placed on a single play of the machine. Alternatively, a maximum-bet button (also not shown) is provided to immediately transfer the maximum number of credits that can be wagered on a single play from the credit meter to the coin-in meter. When the coin-in meter reflects the number of credits that the player intends to wager, the player depresses spin button 53 thereby initiating a game.

The player may choose to have a jackpot won applied to the credit meter.

When the player wishes to cash out, the player depresses a cash-out button 74, which causes the credits on the credit meter to be paid in coins to the player at a hopper 76 or by ticket at a ticket printer 78, which is part of machine 12. The machine consequently pays to the player, via hopper 76 or ticket printer 78, the value of the credit meter in the local currency.

Card reader 60 reads a player-tracking card 66 that is issued by the gaming venue to individual players who choose to have such a card. Card reader 60 and player-tracking card 66 are known in the art. Briefly summarizing such a system, a player registers with the gaming venue prior to commencing gaming. The gaming venue issues a unique player-tracking card to the player and opens a corresponding player account that is stored on accounting patron loyalty database 36 (in FIG. 1). The account includes the player's name and mailing address and perhaps other information of interest to the gaming venue in connection with marketing efforts. Prior to playing one of the EGMs in FIG. 1, the player inserts card 66 into reader 60 thus permitting accounting patron loyalty database 36 to track player activity, such as amounts wagered and won and rate of play.

To reward the player for using the card, the gaming venue awards each player points proportional to the money wagered by the player. Players consequently accrue points at a rate related to the amount wagered. The points are displayed on a service display 72. In one or more embodiments, the service display 72 may be a touch-screen display to enable information to be presented to a player as well as player commands to be received by the gaming machine.

In other implementations, points may be accumulated in the player account as a function of a broad variety a gaming activity, and not just as a function of credits wagered. For example, points may be accumulated in a player account as a function of the frequency of wagering over a time period, or even as a function of non-wagering gaming activity such as time that a player leaves their player tracking card inserted in a gaming machine. Points may also be accumulated based upon the number of games played, credits won or lost (and not only credits wagered) by a player on a bet, total credits or lost won by a player, etc. The present disclosure contemplates other alternatives.

In such systems, a player may take his or her card to a special desk in the gaming venue where a gaming venue employee scans the card to determine how many accrued points are in the player's account. Alternately the player may have the card read at one of several kiosks in the gaming venue. The player may then redeem points for selected merchandise, meals in gaming venue restaurants, or the like, which each have assigned point values.

In addition to point accrual based on play, in certain embodiments points are awarded to reward players for signing up for carded play, to welcome back returning players and the like. In EGMs which include the Xtra Credit™ system provided by IGT™, players are able to convert their points directly on an EGM to use as extra credits for use in placing wagers on that EGM, so that players experience uninterrupted and more game play and longer entertainment.

Once a user has inserted his or her player tracking card 66 into the reader 60 of EGMs including the Xtra Credit™ system, the SMI 50 retrieves player tracking data associated with that player from the accounting/patron loyalty database 36 (in FIG. 1). The player tracking data includes points accrued by or awarded to that player.

In the above-described embodiment, the points are stored in the player account on accounting/patron loyalty database 36. However, in other embodiments the awarded points may be stored in a machine-readable memory of the player-tracking card 66, a memory device associated with an EGM being used by a player, or indeed at any other network-accessible location.

The network accessible location at which the player-redeemable points are stored need not be associated with a particular player or player account. For example, the gaming venue may award points to players by providing them with points awards cards on which player-useable points are stored. The stored points may be read and available for use by the player—for example, by conversion into monetary units which can then be converted into credits for wagering, or by redemption for merchandise, beverages, meals and the like—upon insertion of such the points awards card in the card reader 60.

Figure 3:
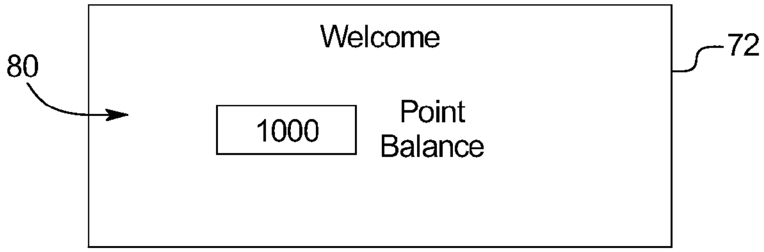
FIGS. 3, 4, 5, 6 and 7 are illustrative examples of example screen displays presented to a player of an electronic gaming machine shown in FIG. 2 during conversion of points attributed to a player into monetary units.
Figure 4:
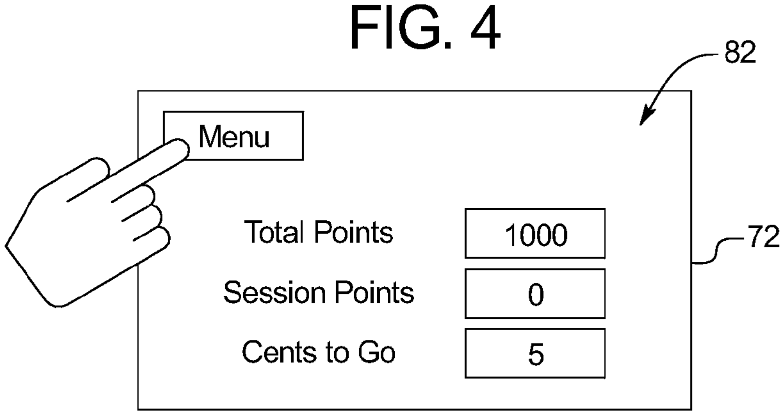

FIGS. 3 and 4 depict exemplary images 80 and 82 displayed consecutively on the touch-screen service display 72 after insertion of a player tracking card into the reader to show a player their accumulated or awarded points.

Figure 5:
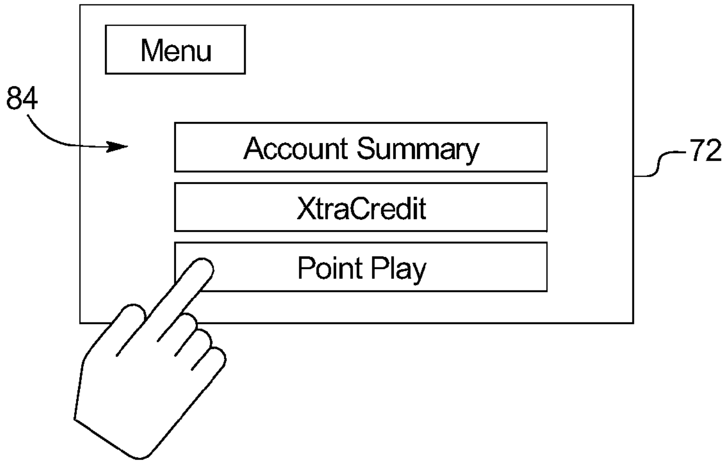
Figure 6:
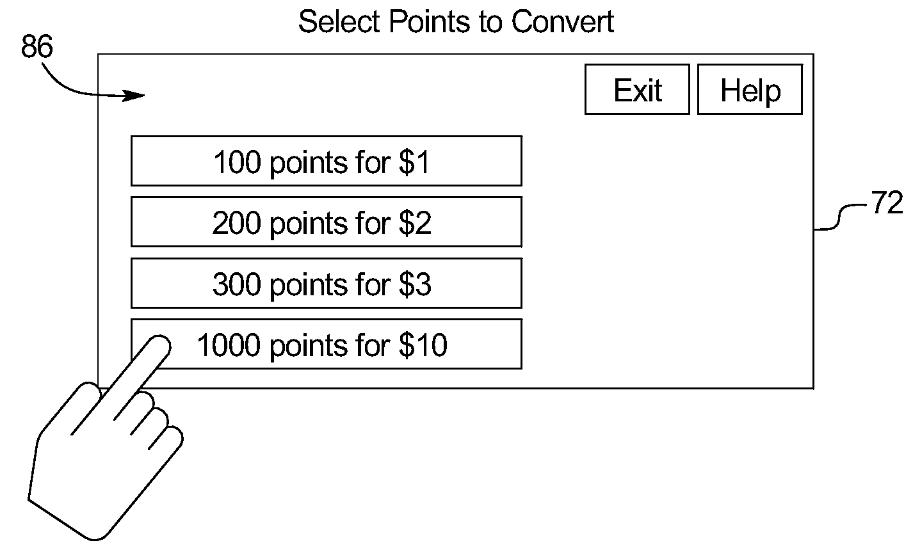

When the player presses a "Menu" button of the image 82 shown on the display 72, a further image 84 is displayed on the display 72. As can be seen in FIG. 5, the image 84 notably displays a "Point Play" button. When the player presses in the "Point Play" button, the player is presented with a further image 86 on the display 72, as can be seen in FIG. 6, which shows a series of buttons to enable the player to select an amount of points which can be converted into credits for wagering on the gaming machine 12. In this illustrative example, a player can choose to: (a) convert 100 points into monetary units of $1.00; (b) convert 200 points into monetary units of $2.00; (c) convert 300 points into monetary units of $3.00; or (d) convert 1000 points into monetary units of $10.00. In this example, the conversion rate at which the points are converted into corresponding monetary units is 1 point=1 cent although it will be appreciated that one or more different conversion rates may be used in other embodiments.

Figure 7:
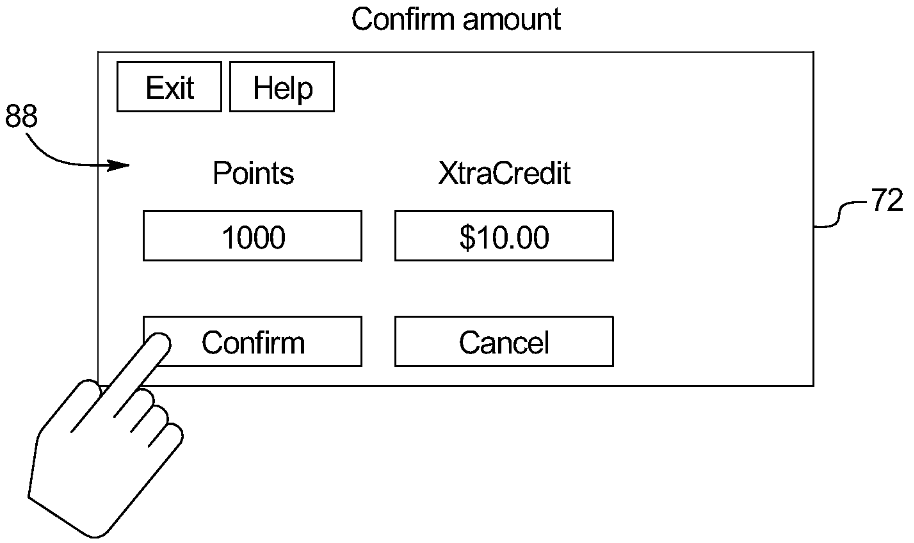
Figure 8:
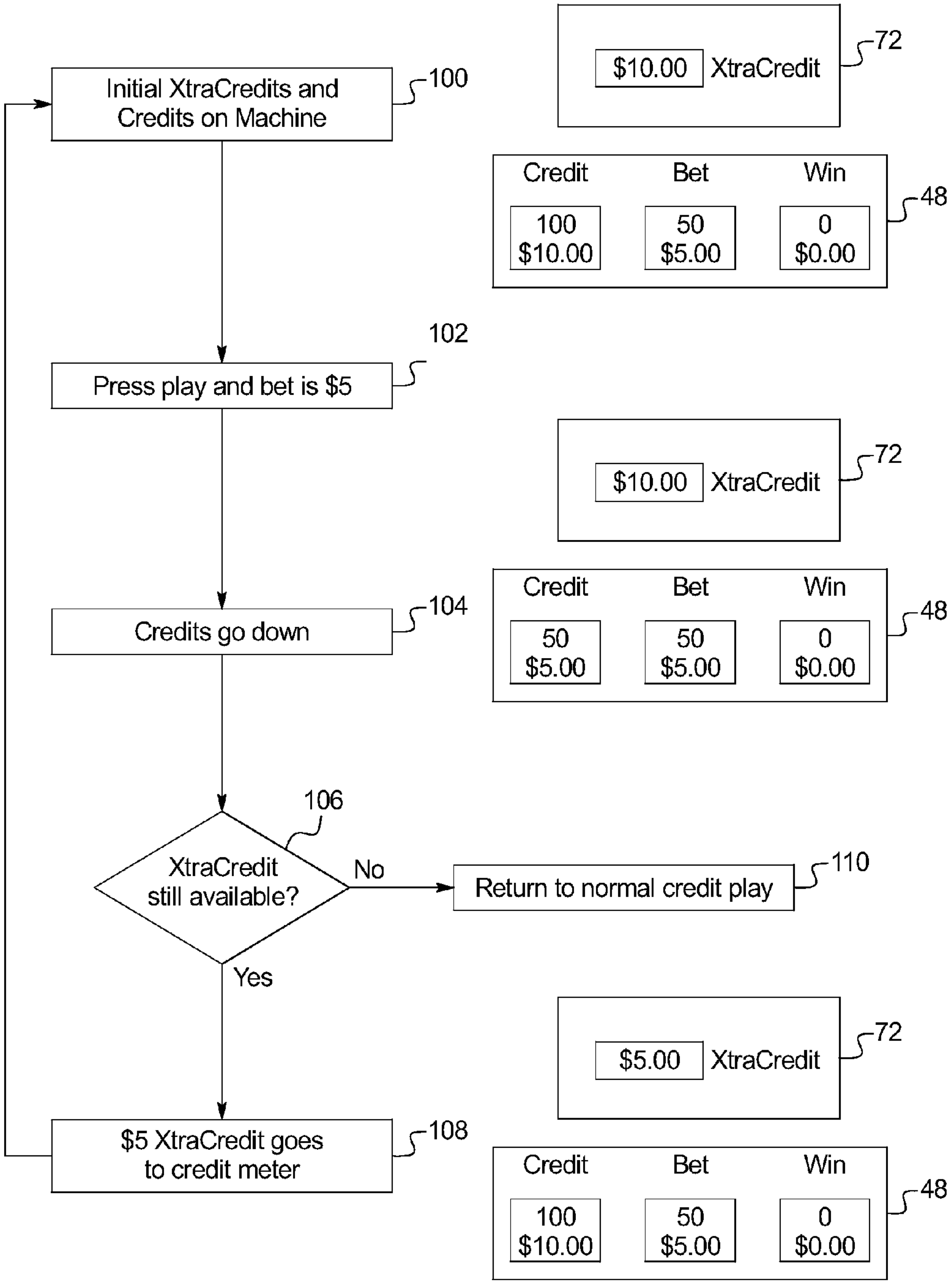
FIG. 8 depicts a flow chart, and accompanying example screen displays, showing the steps involved in the conversion of the monetary units shown in FIG. 7 into credits for wagering on the electronic gaming machine shown in FIG. 2.

Once the player has selected a button corresponding to the desired amount of points to be converted, he or she is presented with a further image 88 on the display 72, as shown in FIG. 7, and asked to confirm the operation by pressing on a "Confirm" button.

As shown in FIG. 7, at step 100, the display 72 shows to the player monetary units able to be converted into credits for wagering on the gaming machine 12, while the display 48 generates representations of a credit meter, a coin-in meter and a win meter. In this illustrative example, display 72 shows that an amount of $10.00 has been converted from points in the player account. The credit meter displays 100 credits and a corresponding value of $10.00 (indicating that the gaming machine has a base denomination of 10 cents), the coin-in meter displays 50 credits and a corresponding value of $5.00 which will be wagered the next time the spin button 53 is depressed, and the win meter displays that 0 credits and a corresponding value of $0.00 have been won by the player.

At step 102, the player depressed the spin button 53, which causes a bet of 50 credits and a corresponding value of $5.00 to be placed on the outcome of the next game (spinning reel positions) played on the EMG. If no winning outcome occurs, then at step 104 the credits shown on the credit meter are reduced by the amount of the credits applied to the coin-in meter before the next wager. In this illustrative example, the credit meter now displays 50 credits and a corresponding value of $5.00 whereas the coin-in meter once again displays 50 credits and a corresponding value of $5.00.

At step 106, the gaming machine determines if there are still monetary units shown on the display 72. If so, then at step 108, at least some of the monetary units are converted into credits on the credit meter to compensate for the reduction in credits on the credit meter described in the preceding paragraph. In this illustrative example, the credit meter once again displays 100 credits and a corresponding value of $10.00, the coin-in meter displays 50 credits and a corresponding value of $5.00 which will be wagered the next time the spin button 53 is depressed, but the display 72 now shows that a reduced monetary amount of $5.00.

Steps 100 to 108 are repeated until there is no longer any monetary units shown on the display 72, in which case, normal credit play continues at step 110. That is, the credit meter will only indicate credits and corresponding value from bills input to the gaming machine via the bill acceptor 68.

When the player has concluded play on the machine 12, he or she can redeem any balance remaining of the credit meter. For example, if cash-out button 74 is depressed while card 66 is received in the card reader 60, the credits on the credit meter are transferred to the player account record. As soon as this transfer occurs, the display 72 indicates the amount transferred to the player. After the transfer, the player record and associated credits are transferred via a connection 22 over the network 10 to the host computer.

The term "host computer" as used herein may refer to a processor, a controller or a memory, which may at any location, including multiple locations, accessible from the network 10. The host computer may even be housed in, or form part of, one or more of the EGMs 12 and 14. In the present example, the host computer includes a dedicated storage area on database server 34.

In order to increase player interest and reward play on the electronic gaming machines 12 and 14, the present disclosure provides a personal points multiplier or other modifier that may be awarded to a player. In one exemplary embodiment, the personal points multiplier is able to be applied to the player-useable points so as to increase the points available to be converted into monetary units, in a manner depicted in FIGS. 3 to 7. In these example embodiments, the personal points multiplier is personal to the player and independent of, separate from, and distinct from any personal points multiplier employed for any other player. Thus, the personal points multiplier for each person may be tailored for that person, that person's gaming activity, and that person's other activities that are relevant for the gaming establishment.

The value of the personal points multiplier awarded may be chosen from the bank of different point multiplier values maintained in the database 45 or otherwise suitably selected. For example, the bank of point multiplier values may include a 2×, 10×, and 100× point multipliers which may variously be awarded to a player. It should be appreciated that the multipliers may be selected in various different manner for different players, such as depending on the player tier level in the player tracking system. It should also be appreciated that different point multiplier values may be selected for the player at different points in time It should thus be appreciated that the personal points multiplier can be applied to at least one of, to at least some of or to all of player-useable points. In one or more embodiments, the personal points multiplier may only be able to be applied to points earned during a particular gaming session or other period of time.

For example, a first player may commence a gaming session with 99,000 points accumulated in their player account and engage in a modest amount of gaming activity which would ordinarily earn them a further 1,000 points. In this case, a personal points multiplier of 1.1× may be awarded to the first player to increase the 1,000 earned points by 10% to 1,100 points.

However, a second player may commence a gaming session with only 50,000 points accumulated in their player account but engage in a greater amount of gaming activity which would ordinarily earn them a further 50,000 points. In this case, the second player may be rewarded with a personal points multiplier of 1.5×, so that the 50,000 earned points is increased by 50% to 75,000 points. Thus, it should be appreciated that the personal points multiplier may be based on the amount of the player wagering activity and/or may be based on other factors.

In one or more embodiments, the awarded personal points multiplier can only be applied to player-useable points during a predetermined time period. For example, a 5 minute or 15 minute period only may be made available to a player to use an awarded point multiplier.

To further increase player interest, the player may be able to select when to initiate the predetermined time period. The player may also be able to pause the predetermined time period. The timers maintained in the database 47 are used to control the period during which the point multiplier values are available to players.

Figure 9:
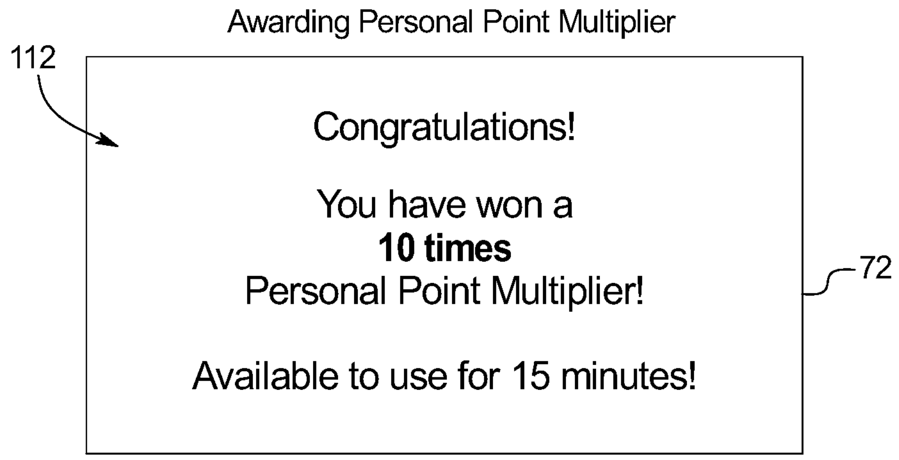
FIGS. 9 and 10 are illustrative example screen displays presented to a player of the electronic gaming machine shown in FIG. 2 during the awarding and use of a personal points multiplier prior to conversion of points into monetary units.

As seen in FIG. 9, upon being awarded a personal points multiplier, an image 112 is presented to the EGM player on the display 72, indicating that the personal points multiplier has been awarded to them, the value of the personal points multiplier, and the time period available for the personal points multiplier to be used. In other embodiments, the EGM does not inform the player that the personal points multiplier has been awarded.

Figure 10:
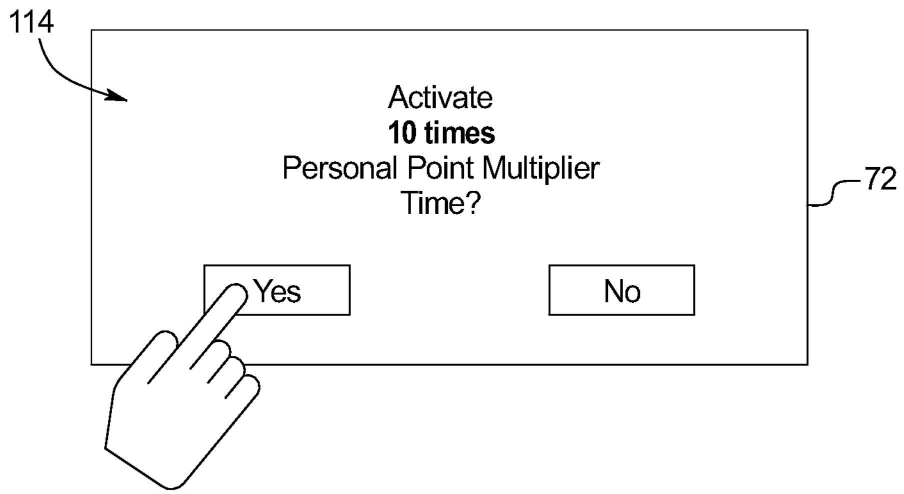

The player is then presented with an image 114 shown in FIG. 10, inviting the player to initiate the time period available for the personal points multiplier. If the player chooses to do so by pressing on the "Yes" button provided, the relevant timer maintained in the database 47 commences operation. The personal points multiplier may be awarded in a number of different ways. For example, the awarded may be made during a preselected awards period, such as Lucky Time™ on EGMs provided by IGT™. Alternatively, the personal points multiplier may be awarded based on the occurrence of a game event, such as occurs during the Lucky Coin™ feature on EGMs provided by IGT™, whether or not the event relates to a winning wager or another player or machine detectable event which may occur during operation of EGMs. In other embodiments, a player of one of the EGMs may be awarded the personal points multiplier as a celebration prize as a result of a winning wager being placed on another of the EGMs by another player.

While in the above described embodiments the player is able to selectively apply the personal points multiplier to the points in his or her player account, in other embodiments the personal points multiplier may be automatically applied.

While the present disclosure has generally been described in the context of a gaming systems in which player-usable points are converted into monetary units which can in turn be converted into credits for wagering on EGMs, it should be understood that the present disclosure is also applicable to gaming systems in which points are usable by players in other ways, such as by redemption for merchandise, beverages, meals and the like.

In embodiments in which points are stored in an account at a network accessible location, that account need not necessarily be associated with a particular player, but may be associated with a group of players, a company, a club or other entity with which one or more players are associated.

The personal points multiplier could be applied to player-usable points prior to storage in account, ticket, card or other network-accessible location. For example, player-useable points awarded to a player may be temporarily stored in a local memory of an EGM being used by a player. Any personal points multiplier awarded to a player could be applied to the points in the EGM's local memory prior to being transferred to a player account.

In another example, the personal points multiplier could be applied to points as they are accumulated. In this case, the multiplier could be applied to points even prior to their storage in a local memory of a EGM being used by a player.

While the above-described embodiments of the present disclosure relate to the accumulation of points in a player account, the conversion of those points into monetary units, and the subsequent conversion of those monetary units into credits for wagering on an EGM (at the base denomination of that EGM), the present disclosure is generally applicable to other gaming systems in which units of value other than points are used. The units may relate to a number of virtual tokens or like items, rather than a simple numerical or point value.

While the present invention has been described in conjunction with a limited number of embodiments, it will be apparent to those skilled in the art that many alternatives, modifications and variations in light of the foregoing description are possible. Accordingly, the present invention is intended to embrace all such alternatives, modifications and variations as may fall within the spirit and scope of the invention as disclosed.

The invention is claimed as follows:

1. A gaming system comprising:

a housing;

a plurality of input devices supported by the housing, said plurality of input devices including:

(i) an acceptor, and (ii) a cashout device;

at least one display device supported by the housing;

at least one processor; and at least one memory device which stores a plurality of instructions, which when executed by the at least one processor, cause the at least one processor to operate with said at least one display device and said plurality of input devices to:

(a) if a physical item is received via the acceptor, establish a credit balance based, at least in part, on a monetary value associated with the received physical item, (b) for a play of a game:

(i) determine a game outcome, and (ii) display the determined game outcome to a player, (c) if a designated game event occurs in association with the play of the game:

(i) accumulate a first quantity of player-useable points, and (ii) apply a personal points multiplier to at least one of the first quantity of player-useable points to result in a multiplied quantity of player-usable points, (d) if the designated game event does not occur in association with the play of the game:

(i)accumulate the first quantity of player-useable points, and (ii) not apply the personal points multiplier to any of the first quantity of player-useable points, and (e) if a cashout input is received via the cashout device, cause an initiation of any payout associated with the credit balance.

2. The gaming system of claim 1, wherein when executed by the at least one processor, the plurality of instructions cause the at least one processor to provide a benefit to the player based on one of: said multiplied quantity of player-useable points and said first quantity of player-useable points.

3. The gaming system of claim 1, wherein when executed by the at least one processor, the plurality of instructions cause the at least one processor to operate with a network-accessible points storage device to store at least the first quantity of player-useable points.

4. The gaming system of claim 1, wherein when executed by the at least one processor if the designated game event occurs in association with the play of the game, the plurality of instructions cause the at least one processor to apply the personal points multiplier to at least one of a second quantity of player-useable points stored in association with a player account.

5. The gaming system of claim 1, wherein when executed by the at least one processor for the play of the game, the plurality of instructions cause the at least one processor to determine any award associated with the determined game outcome and display any determined award associated with the determined game outcome.

6. The gaming system of claim 1, wherein when executed by the at least one processor for the play of the game, the plurality of instructions cause the at least one processor to randomly determine the game outcome.

7. A gaming system server comprising:

at least one processor; and at least one memory device which stores a plurality of instructions, which when executed by the at least one processor, cause the at least one processor to:

(a) for a play of a game:

(i) determine a game outcome, and (ii) cause at least one display device to display the determined game outcome to a player, wherein a credit balance is increasable based on any award associated with the determined game outcome, said credit balance being increasable via an acceptor of a physical item associated with a monetary value, and said credit balance being decreasable via a cashout device, (b) if a designated game event occurs in association with the play of the game:

(i) accumulate a first quantity of player-useable points, and (ii) apply a personal points multiplier to at least one of the first quantity of player-useable points to result in a multiplied quantity of player-usable points, and (c) if the designated game event does not occur in association with the play of the game:

(i) accumulate the first quantity of player-useable points, and (ii) not apply the personal points multiplier to any of the first quantity of player-useable points.

8. The gaming system server of claim 7, wherein when executed by the at least one processor, the plurality of instructions cause the at least one processor to provide a benefit to the player based on one of: said multiplied quantity of player-useable points and said first quantity of player-useable points.

9. The gaming system server of claim 7, wherein when executed by the at least one processor, the plurality of instructions cause the at least one processor to operate with a network-accessible points storage device to store at least the first quantity of player-useable points.

10. The gaming system server of claim 7, wherein when executed by the at least one processor if the designated game event occurs in association with the play of the game, the plurality of instructions cause the at least one processor to apply the personal points multiplier to at least one of a second quantity of player-useable points stored in association with a player account.

11. The gaming system server of claim 7, wherein when executed by the at least one processor for the play of the game, the plurality of instructions cause the at least one processor to determine any award associated with the determined game outcome and cause the at least one display device to display any determined award associated with the determined game outcome.

12. The gaming system server of claim 7, wherein when executed by the at least one processor for the play of the game, the plurality of instructions cause the at least one processor to randomly determine the game outcome.

13. A method of operating a gaming system, said method comprising:

(a) for a play of a game:

(i) causing at least one processor to execute a plurality of instructions to determine a game outcome, and (ii) causing at least one display device to display the determined game outcome to a player, wherein a credit balance is increasable based on any award associated with the determined first game outcome, said credit balance being increasable via an acceptor of a physical item associated with a monetary value, and said credit balance being decreasable via a cashout device, (b) if a designated game event occurs in association with the play of the game:

(i) causing the at least one processor to execute the plurality of instructions to accumulate a first quantity of player-useable points, and (ii) causing the at least one processor to execute the plurality of instructions to apply a personal points multiplier to at least one of the first quantity of player-useable points to result in a multiplied quantity of player-usable points, and (c) if the designated game event does not occur in association with the play of the game:

(i) causing the at least one processor to execute the plurality of instructions to accumulate the first quantity of player-useable points, and (ii) not applying the personal points multiplier to any of the first quantity of player-useable points.

14. The method of claim 13, which includes providing a benefit to the player based on one of: said multiplied quantity of player-useable points and said first quantity of player-useable points.

15. The method of claim 13, which includes causing the at least one processor to execute the plurality of instructions to operate with a network-accessible points storage device to store at least the first quantity of player-useable points.

16. The method of claim 13, which includes, if the designated game event occurs in association with the play of the game, causing the at least one processor to execute the plurality of instructions to apply the personal points multiplier to at least one of a second quantity of player-useable points stored in association with a player account.

17. The method of claim 13, which includes, for the play of the game:

causing the at least one processor to execute the plurality of instructions to determine any award associated with the determined game outcome, and causing the at least one display device to display any determined award associated with the determined game outcome.

18. The method of claim 13, which includes, for the play of the game, causing the at least one processor to execute the plurality of instructions to randomly determine the game outcome.

19. The method of claim 13, which is executed through a data network.

20. The method of claim 19, wherein the data network is an internet.

* * * * *